(12) United States Patent
Blakeman et al.

(10) Patent No.: US 7,264,785 B2
(45) Date of Patent: Sep. 4, 2007

(54) SELECTIVE CATALYTIC REDUCTION

(75) Inventors: Philip Gerald Blakeman, Cambridge (GB); Martyn Vincent Twigg, Cambridge (GB); Andrew Peter Walker, Royston (GB); Stanislaw Edmund Golunski, Reading (GB); Guy Richard Chandler, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 433 days.

(21) Appl. No.: 10/499,714

(22) PCT Filed: Dec. 20, 2002

(86) PCT No.: PCT/GB02/05839

§ 371 (c)(1),
(2), (4) Date: Nov. 3, 2004

(87) PCT Pub. No.: WO03/054364

PCT Pub. Date: Jul. 3, 2003

(65) Prior Publication Data

US 2005/0069476 A1    Mar. 31, 2005

(30) Foreign Application Priority Data

Dec. 20, 2001 (GB) ................... 0130474.0
Mar. 25, 2002 (GB) ................... 0206888.0

(51) Int. Cl.
  *B01D 53/90*  (2006.01)
  *B01D 53/94*  (2006.01)
  *B62D 47/00*  (2006.01)

(52) U.S. Cl. ............... 423/213.2; 423/213.7; 423/239.1; 422/105; 180/313

(58) Field of Classification Search ............ 423/213.2, 423/213.7, 239.1; 422/105; 180/313
See application file for complete search history.

(56) References Cited

U.S. PATENT DOCUMENTS

| | | |
|---|---|---|
| 3,767,764 A | 10/1973 | Dolbear |
| 4,902,487 A | 2/1990 | Cooper et al. |
| 5,785,937 A | 7/1998 | Neufert et al. |
| 5,894,728 A | 4/1999 | Wakamoto |
| 5,968,464 A | 10/1999 | Peter-Hoblyn et al. |
| 6,125,629 A | 10/2000 | Patchett |

(Continued)

FOREIGN PATENT DOCUMENTS

DE    42 14 183 A1    6/1993

(Continued)

OTHER PUBLICATIONS

David L. Trimm and Z. Ilsen Önsan, "Onboard Fuel Conversion for Hydrogen-Fuel-Cell-Driven Vehicles," *Catalysis Reviews*, 43 (1&2), 31-84 (2001).

(Continued)

*Primary Examiner*—Timothy C. Vanoy
(74) *Attorney, Agent, or Firm*—RatnerPrestia (57) ABSTRACT

A method of selectively catalysing the reduction of $NO_x$ in an exhaust gas flowing in an exhaust system of an internal combustion engine comprising a filter (40) for particulate matter comprising a catalyst capable of selectively catalysing the reduction of $NO_x$ with a reducing agent, which method comprising introducing a reducing agent, or a precursor thereof, into the exhaust gas and contacting the resulting gas with the filter (40).

86 Claims, 5 Drawing Sheets

U.S. PATENT DOCUMENTS

| | | |
|---|---|---|
| 6,192,676 B1 | 2/2001 | Zürbig et al. |
| 6,299,847 B1 * | 10/2001 | Allen .......................... 423/237 |
| 6,314,722 B1 | 11/2001 | Matros et al. |
| 7,118,721 B2 * | 10/2006 | Rini et al. ................ 423/239.1 |
| 7,146,802 B2 * | 12/2006 | Lee .............................. 60/286 |
| 2002/0021988 A1 | 2/2002 | Huthwohl et al. |
| 2006/0039843 A1 * | 2/2006 | Patchett et al. .......... 423/239.1 |

FOREIGN PATENT DOCUMENTS

| | | |
|---|---|---|
| DE | 198 34 541 A1 | 2/2000 |
| DE | 1 174 599 A1 | 1/2002 |
| EP | 0 283 913 A2 | 9/1988 |
| EP | 0 341 832 A2 | 11/1989 |
| EP | 0 487 886 A1 | 6/1992 |
| EP | 0 510 498 A1 | 10/1992 |
| EP | 0 747 581 A1 | 12/1996 |
| EP | 0 773 354 A1 | 5/1997 |
| EP | 0 796 983 A1 | 9/1997 |
| EP | 0 802 315 A2 | 10/1997 |
| EP | 0 861 972 A1 | 9/1998 |
| GB | 2 333 471 A | 7/1999 |
| GB | 2 361 653 A | 10/2001 |
| JP | 3-130522 | 6/1991 |
| WO | WO-95/02655 | 1/1995 |
| WO | WO-99/39809 | 8/1999 |
| WO | WO-99/48805 | 9/1999 |
| WO | WO-99/55446 | 11/1999 |
| WO | WO-00/21647 | 4/2000 |
| WO | WO-00/28196 | 5/2000 |
| WO | WO-00/29726 | 5/2000 |
| WO | WO-00/29728 A1 | 5/2000 |
| WO | WO-00/74823 A1 | 12/2000 |
| WO | WO-00/76637 A1 | 12/2000 |
| WO | WO-01/12320 A1 | 2/2001 |
| WO | WO-01/80977 A1 | 11/2001 |
| WO | WO-01/96717 A1 | 12/2001 |

OTHER PUBLICATIONS

International Search Report dated Jul. 8, 2003, from International Application No. PCT/GB02/05839.

British Search Report dated Aug. 30, 2002, from British Application No. 0206888.0.

P. G. Blakeman, G. R. Chandler, G. A. John and A. J. J. Wilkins, "Investigations into NOx Aftertreatment with Urea SCR for Light-Duty Diesel Vehicles," SAE Technical Paper Series 2001-01-3624, presented at the International Fall Fuels and Lubricants Meeting and Exposition, San Antonio, Texas, Sep. 24-27, 2001.

* cited by examiner

SELECTIVE CATALYTIC REDUCTION

This application is the U.S. national phase application of PCT International Application No. PCT/GB02/05839, and claims priority of British Patent Application No. 0130474.0 and British Patent Application No. 0206888.0.

The present invention relates to improvements in selective catalytic reduction (SCR) of nitrogen oxides ($NO_x$) in exhaust gas from internal combustion (IC) engines using a reducing agent, and in particular it relates to the use of SCR technology to treat $NO_x$ at relatively low temperatures e.g. following cold-start The reducing agent can be a $NO_x$ specific reactant.

By "$NO_x$ specific reactants" we mean a reducing agent that, in most exhaust gas conditions, preferentially reduces $NO_x$ over exhaust gas components. Examples of $NO_x$-specific reactants include nitrogenous compounds such as nitrogen hydrides, e.g. ammonia or hydrazine, or an ammonia precursor.

The ammonia can be in anhydrous form or as an aqueous solution, for example.

By "ammonia precursors" we mean one or more compounds from which ammonia can be derived, e.g. by hydrolysis. These include urea ($CO(NH_2)_2$) as an aqueous solution or as a solid or ammonium carbamate ($NH_2COONH_4$). If the urea is used as an aqueous solution, a eutectic mixture, e.g. a 32.5% $NH_3$ (aq) is preferred. Additives can be included in the aqueous solutions to reduce the crystallisation temperature.

Urea hydrolyses at temperatures above 160° C. according to equation (1) to liberate $NH_3$ itself. It also thermally decomposes at this temperature and above according to equations (2) and (3) resulting in reduction of $NO_x$.

$$CO(NH_2)_2 + H_2O \rightarrow 2NH_3 + CO_2 \quad (1)$$

$$CO(NH_2)_2 \rightarrow .NH_2 + CO \quad (2)$$

$$NH_2 + NO \rightarrow N_2 + H_2O \quad (3)$$

The application of $NH_3$ SCR technology to treat $NO_x$ emissions from IC engines, particularly lean-burn IC engines, is well known. Several chemical reactions occur in the $NH_3$ SCR system, all of which represent desirable reactions which reduce $NO_x$ to elemental nitrogen. The dominant reaction mechanism is represented in equation (4).

$$4NO + 4NH_3 + O_2 \rightarrow 4N_2 + 6H_2O \quad (4)$$

Competing, non-selective reactions with oxygen can produce secondary emissions or may unproductively consume ammonia. One such non-selective reaction is the complete oxidation of ammonia, represented in equation (5).

$$4NH_3 + 5O_2 \rightarrow 4NO + 6H_2O \quad (5)$$

Vehicle manufacturers are interested in adopting $NH_3$ SCR technology as a viable means of reducing emissions of $NO_x$ from IC engines to meet future limits on $NO_x$ emissions e.g. Euro 4 and Euro IV, both due in 2005 (for some heavier light commercial vehicles Euro 4 is due in 2006). One problem associated with $NH_3$ SCR technology is to maintain good $NO_x$ conversion when the exhaust gas temperature is relatively low, e.g. during extended idling or following cold-start. $NO_x$ conversion can be achieved using $NH_3$ at temperatures as low as 150° C. using Pt-based catalysts, but the preferred delivery form of ammonia, aqueous urea solution, does not decompose significantly below 200° C. Pt-based catalysts generate nitrous oxide (NO) according to equation (5) at above about 225° C.

Changes in engine test cycles have been introduced in the present Euro III standard and will govern Euro IV type approval of new vehicles. In particular, the new test cycles include the European Stationary Cycle (ESC); tie European Transient Cycle (ETC); and a test for smoke opacity on the European Load Response (ELR) test. These cycles and tests include significant periods at low temperature. To attain type approval, a new vehicle will have to pass both the ETC and ESC/ELR tests.

Presently, urea is the preferred source of ammonia for mobile applications because it is less toxic than ammonia, it is easy to transport and handle, is inexpensive and commonly available.

Early methods of using urea as a source of ammonia in exhaust systems involved injecting urea directly into the exhaust gas, optionally over an in-line hydrolysis catalyst (see EP-A-0487886 (incorporated herein by reference)). However, not all urea is hydrolysed in such arrangements, particularly at lower temperatures.

Incomplete hydrolysis of urea can lead to increased PM emissions on tests for meeting the relevant emission test cycle because partially hydrolysed urea solids or droplets will be trapped by the filter paper used in the legislative test for PM and counted as PM mass. Furthermore, the release of certain products of incomplete urea hydrolysis, such as cyanuric acid, is environmentally undesirable. Another method is to use a pre-injection hydrolysis reactor (see U.S. Pat. No. 5,968,464 (incorporated herein by reference)) held at a temperature above that at which urea hydrolyses.

It can be seen that there remains a need for technology to improve the treatment of $NO_x$ in exhaust gases from IC engines at relatively low temperatures. The present invention comprises a number of improvements to the SCR art and in particular to the use of SCR technology to treat $NO_x$ at relatively low temperatures, e.g. following cold-start.

It will be appreciated that at lower temperatures, below about 100-200° C., ammonia can also react with $NO_2$ to produce explosive ammonium nitrate ($NH_4NO_3$) according to equation (6):

$$2NH_3 + 2NO_2 + H_2O \rightarrow NH_4NO_3 + NH_4NO_2 \quad (6)$$

For the avoidance of doubt, the present invention does not embrace such reactions or the promotion of conditions which bring them about. For example, the reaction can be avoided by ensuring that the temperature does not fall below about 200° C. or by supplying into a gas stream less than, the precise amount of $NH_3$ necessary for the stoichiometric reaction with $NO_x$ (1 to 1 mole ratio). For cold start applications, measures to prevent water from contacting the catalyst while an engine is switched off can be adopted. These can include disposing a water trap, e.g. a zeolite, upstream of the catalyst to reduce the amount of water vapour contacting the catalyst until it is heated sufficiently. A water trap can also be positioned downstream of the catalyst, to prevent atmospheric humid air from travelling up the exhaust pipe. An electric heater can also be employed to drive off moisture from the catalyst pre-cold start. Such arrangements are described in our EP 0747581, incorporated herein by reference.

In our WO 01/96717 (incorporated herein by reference), we describe an exhaust system comprising a reactor for treating an exhaust gas, which reactor comprising an oxidation catalyst, au optionally catalysed filter do ream of the oxidation catalyst, a $NO_x$ absorbent or SCR catalyst downstream of the filter and a $NO_x$ reduction section downstream of the absorbent or SCR catalyst. Where catalysed, the filter can comprise $La/Cs/V_2O_5$ or PtMgO. The substrate supporting the oxidation catalyst can include a region that is substantially free of catalyst and the exhaust system can comprise means for supplying a reactant upstream of the oxidation catalyst such that the reactant flowing over the region can pass to downstream components without being oxidised by the oxidation catalyst. The reactant can be a $NO_x$-specific reactant, especially a nitrogen hydride such as ammonia or hydrazine.

EP-A0341382 or U.S. Pat. No. 4,902,487 (both incorporated herein by reference) describe a method of treating diesel exhaust gas including PM and $NO_x$ unfiltered over an oxidation catalyst to convert NO to $NO_2$, collecting the PM on a filter downstream of the oxidation catalyst and combusting trapped PM in the $NO_2$. This technology is commercially available as Johnson Matthey's CRT®. Further steps can be added downstream of the filter. For example a $NO_x$ removal step including injection of $NO_x$-specific reactant (as defined above) and contacting gas leaving the filter with an SCR catalyst (see our WO 00/21647 (incorporated herein by reference)).

EP-A-0283913 (incorporated herein by reference) describes a process and apparatus to remove $NO_x$ from a gas stream. The process is characterised by passing the gas stream through a first catalytic zone m the absence of added ammonia and in the presence of an oxidation catalyst to convert the NO content thereof to $NO_2$, thereafter introducing ammonia into the gas stream, and catalytically reducing the $NO_2$ to nitrogen and water in the presence of a catalyst. The catalysts are carried on flow-through monoliths.

In our WO 99/39809 (incorporated herein by reference) we describe a SCR system for treating combustion exhaust gas containing $NO_x$ and particulates, comprising in combination and in order, an oxidation catalyst effective to convert at least a portion of NO in the $NO_x$ to $NO_x$ to $NO_2$ and enhance the $NO_2$ content of the exhaust gas, a particulate trap, a source of reductant fluid, injection means for the reductant fluid located downstream of the particulate trap and an SCR catalyst. Such an arrangement is marketed by Johnson Matthey as its SCRT™.

In our WO 00/74823 (incorporated herein by reference) we describe a method of treating exhaust gas, especially from diesel engines producing low quantities of $NO_x$, which method comprising a first step in which hydrocarbon in the exhaust gas is oxidised, producing $CO_2$ and $H_2O$, and a second step in which soot is combusted by reaction with $NO_2$. The method is characterised by the oxidation of ammonia (or a precursor thereof) to form $NO_x$, and the introduction of the thus formed $NO_x$ into the exhaust gas before the performance of the second step.

In our WO 99/55446 (the entire content of which is incorporated herein by reference), we describe an exhaust system including a SCR catalyst wherein ammonia or a precursor is supplied intermittently so that it is adsorbed and desorbed during the engine operating cycle.

EP 0773354 describes generating $NH_3$ in situ over a three-way catalyst comprising precious metals (such as Pd, Pt and Rh) carried on a layer of, for example, alumina, during rich running conditions. The $NH_3$ is adsorbed on a catalyst such as Cu-zeolite and is available to reduce $NO_x$ in lean running conditions.

U.S. Pat. No. 6,125,629 describes an exhaust system comprising a close-coupled SCR catalyst and a downstream SCR catalyst and means for selectively injecting an external reductant to the SCR catalysts when they are at catalytically active temperatures.

In a first aspect, the invention provides a method of selectively catalysing the reduction of $NO_x$ in an exhaust gas flowing in an exhaust system of a vehicle comprising a lean-burn internal combustion engine, which exhaust system comprising a first catalyst for selectively catalysing the reduction of $NO_x$ with a nitrogenous reducing agent located at up to 1 metre downstream from an exhaust manifold or turbo, a filter for particulate matter located in an underfloor position, which filter comprising a second catalyst for selectively catalysing the reduction of $NO_x$ with a nitrogenous reducing agent which method comprising introducing the reducing agent, or a precursor thereof, into the exhaust gas upstream of the first catalyst According to a second aspect, the invention provides a vehicle comprising a lean-burn internal combustion engine and an exhaust system therefor, which exhaust system comprising a first catalyst for selectively catalysing the reduction of $NO_x$ with a nitrogenous reducing agent located at up to 1 metre from an exhaust manifold or turbo, means for introducing a nitrogenous reducing agent, or a precursor thereof, into an exhaust gas carried by the exhaust system upstream of the first catalyst and a filter for particulate matter located in an underfloor position, which filter comprising a second catalyst capable of selectively catalysing the reduction of $NO_x$ with a nitrogenous reducing agent In one embodiment the exhaust system filter further comprises a first catalyst capable of selectively catalysing the reduction of $NO_x$ with a reducing agent disposed upstream of the filter, and wherein the reducing agent or the precursor thereof, is introduced into the exhaust gas upstream of the first catalyst.

In one embodiment, the reducing agent, or the precursor thereof, is introduced into the exhaust gas upstream of the first catalyst when the first catalyst is below a first temperature.

In a further embodiment, the reducing agent or, the precursor thereof, is also introduced into the exhaust gas between the first and the second catalyst. Such addition can be controlled to occur when the second catalyst us above a second temperature.

In another embodiment, the supply of reducing agent to the first catalyst is interrupted when the first catalyst is below a third temperature.

In a further embodiment, the supply of reducing agent to the second catalyst is interrupted when the second catalyst is above a fourth temperature.

In another embodiment, the fist catalyst is in the close-coupled position, i.e. positioned sufficiently close enough to the exhaust manifold to be rapidly heated by exhaust gas after switch on, thereby to reach light-off temperature of $NO_x$ reduction, but sufficiently far away from the exhaust manifold to prevent too rapid thermal ageing. Generally "close-coupled" herein is up to about 1 meter, e.g. 50 cm downstream from the exhaust manifold or turbo.

In another embodiment, the exhaust system further comprises a catalyst capable of oxidising NO to $NO_2$ disposed upstream of the filter. The NO oxidation catalyst is disposed downstream of the first catalyst.

This configuration is an improvement on the exhaust system described in our WO 99/39809 and marketed by Johnson Matthey as its SCRT™ device. The oxidation catalyst/diesel particulate filter (DPF) combination has a relatively high thermal mass, so it can take a long time for the underfloor SCR catalyst to reach the temperature at which it can be used. But in the embodiment including our SCRT™ and a close-coupled SCR catalyst to deal with key-on (and low temperature) $NO_x$, the combined system offers significant $NO_x$ conversion advantages over the arrangement described in WO 99/39809.

A further improvement over the SCRT™ arrangement described in our WO 99/39809 can be obtained by catalysing the filter, as described in our EP 0341832, the entire contents of which are incorporated herein by reference. In addition to the filter catalysts described therein such as PGMs e.g. Pt on alumina, the filter can take the form of that described in WO 00/29726 (incorporated herein by reference). For example, it can comprise a first catalyst which comprises a first PGM; a first cerium component; and preferably a zirconium component. There can be a second catalyst in communication with the first catalyst, the second catalyst can comprise a second cerium component.

further advantage of this configuration is that the performance of the oxidation catalyst/DPF combination can sometimes be limited by the engine-out $NO_x$/PM ratio: if there is not enough $NO_x$ coming out of the engine then the catalyst cannot make enough $NO_2$ to react with the engine-out PM. But within this embodiment we can inject urea over the close-coupled SCR catalyst at higher temperatures to provide an extra source of $NO_x$, since when urea/ammonia react with oxygen over a Pt oxidation catalyst, $NO_2$ can be generated. So this close-coupled urea injector can also be used to help with the active regeneration of the DPF under certain conditions.

In addition, in one strategy for regenerating the DPF, the temperature of the exhaust system is raised by e.g. engine means and the NO oxidation catalyst generates $NO_2$ to react with the PM in the downstream DPF. At such high temperatures if an excess of urea is injected over the close-coupled SCR catalyst this can accelerate the rate of regenerating the filter, since an increased proportion of the excess urea/ammonia may be converted into $NO_2$ and this $NO_2$ can also be used to react with PM trapped on the filter, in addition to $NO_2$ derived from oxidation of engine-out $NO_x$.

Another way to convert $NO_x$ at low temperature during engine start-up conditions is to react the emitted $NO_x$ with ammonia which has been pre-adsorbed onto e.g. a zeolite material (see U.S. Pat. No. 5,785,937 and WO 99/55446 incorporated herein by reference). Of course, the amount of $NO_x$ that can be converted depends upon the amount of ammonia stored within the SCR catalyst: once this stored ammonia is depleted, the $NO_x$ conversion available by reaction with stored ammonia is reduced. It is not possible to inject urea to make ammonia for storage at low temperatures e.g. 150° C., because urea does not hydrolyse significantly below about 200° C. We have now found a way of treating $NO_x$ at cold start using e.g. the preferred reductant precursor, urea.

According to a fiber aspect according to the invention, there is provided a method of reducing $NO_x$ in an exhaust gas flowing in an exhaust system of an internal combustion engine following cold-start, which exhaust system comprising a catalyst capable of selectively catalysing the reduction of $NO_x$ with a nitrogenous reducing agent, which catalyst having a light off temperature for the reaction and being capable of adsorbing the nitrogenous reducing agent at below the light off temperature, which method comprising contacting the catalyst with a precursor of the nitrogenous reducing agent after engine key-off, adsorbing the precursor, or the nitrogenous reducing agent derived therefrom, on the catalyst between key-off and start up and reducing $NO_x$ in exhaust gas contacting the catalyst following start up.

According to a further aspect, there is provided an exhaust system for an internal combustion engine, which system comprising a catalyst capable of selectively catalysing the reduction of $NO_x$ with a nitrogenous reducing agent, which catalyst having a light-off temperature for the reaction and being capable of adsorbing the nitrogenous reducing agent or a precursor thereof at below the light-off temperature, means for contacting the catalyst with a precursor of the nitrogenous reducing agent after key-off whereby the precursor, or the nitrogenous reducing agent derived therefrom, is capable of adsorbing on the catalyst between key-off and start up and means for controlling the supply of the precursor to the catalyst wherein the control means is configured to supply the precursor following key off when the catalyst is still sufficiently hot to hydrolyse the precursor to yield the nitrogenous reducing agent.

In one embodiment of this aspect of the invention, the system comprises means for controlling the supply of the precursor to the catalyst. Such control means can include a suitably programmed engine control unit (ECU) or engine management unit including a microprocessor or chip which, in use, controls the supply of the precursor to the catalyst An advantage of this arrangement is that the exhaust system is already hot enough to hydrolyse e.g. the urea at key-off, and since the engine has stopped, there is no $NO_x$ for the ammonia (generated by e.g. hydrolysis of urea of ammonium carbamate) to react with. So the ammonia can be stored on the catalyst ready for the next key-on.

Suitable catalysts for this aspect of the invention comprise zeolites, such as ZSM-5, mordenite, gamma zeolite and beta zeolite or mixtures of any two or more thereof. The zeolite can be metallised or non-metallised e.g. with Fe, V, Cu, Ce, Fe or Pt or any two or more thereof. Where metallised, the metal can be applied using known techniques such as impregnation or ion-exchange.

In another embodiment, a single zeolite material is used both to adsorb and desorb precursor and ammonia and to catalyse the reduction of $NO_x$. In another embodiment the catalyst contains a mixture, of a non-metallised zeolite, e.g. ZSM-5, to adsorb and desorb the precursor and ammonia, and a metallised zeolite e.g. Cu/ZSM-5 to catalyse the reduction of $NO_x$. In this last embodiment, the metallised and non-metallised zeolite can be mixed or the non-metallised zeolite can be disposed on the upstream side to the metallised zeolite.

In a further embodiment, the SCR catalyst is disposed on the downstream end of the filter. This arrangement has the advantage that PM is combusted in $NO_2$ on the upstream part of the filter, and $NO_x$ remaining in the gas following combustion can be reduced over the catalyst downstream.

As mentioned above, it is known from U.S. Pat. No. 5,968,464 to use a heated pre-injection hydrolysis reactor to hydrolyse urea to produce ammonia. However, it is also possible to generate ammonia and partially reduced nitrogen species by catalysing the reaction of some of the fuel, e.g. diesel with a lean-exhaust gas. The ammonia and partially reduced nitrogen species generated can then be used to reduce the remaining $NO_x$ in the exhaust gas.

Catalysts suitable for this reaction are known as reforming catalysts, illustrative examples of which include catalysts based on PGMs and nickel (Ni). For further details, reference can be made to D. L. Trimm and Z. I. Onsan in Catalysis Reviews—Science and Engineering, vol. 43 (2001) pp 31-84, the entire contents of which is incorporated herein by reference.

Further suitable reforming catalysts with utility according to this aspect of the invention include up to 2 wt %, e.g. 1 wt %, rhodium dispersed on a refractory oxide support material which comprises cations of cerium and zirconium—see our WO 99/48805, the entire contents of which is included herein by reference. In addition to the supported up to 2 wt % Rh, such as up to 1 wt % Rh, other catalysts include low loadings of Pt (up to 0.5 wt %, e.g. 0.1 wt %) and Rh—Pt comprising up to 2 wt % Rh (e.g. up to 1 wt % Rh) and up to 0.5 wt % Pt (e.g. up to 0.1 wt %). Supports for the Rh, Pt Rh—Pt and Ni include alumina, titania, Cherri, zirconia, silica, silica-alumina and mixtures, and mixed oxides containing any two or more thereof.

By "partially reduced nitrogen species" herein we include nitriles, amines, oximes and isocyantes.

The gas composition generated over the reforming catalyst containing ammonia and/or partially reduced nitrogen species can be referred to as a "reformate".

The SCR catalysts for use in the present invention can be any known to the person skilled in the art. However, the first, second, third and fourth temperatures may depend on the nature of the catalyst and accordingly the introduction of reducing agent injected into the system as pre-programmed into the control means. A catalyst can be chosen according to the conditions it is expected to encounter e.g. temperature range of operation, exhaust gas composition, and the duty it is to perform e.g. the percentage $NO_x$ conversion. Such parameters can be assessed using exhaust system modelling techniques known in the art. Of course, a catalyst can be chosen according to its propensity to oxidise ammonia to NO at a particular temperature for the performance of exhaust treatment processes further downstream.

For example, Pt-based SCR catalysts can catalyse the reduction of $NO_x$ with ammonia at between about 175° C. and about 250° C. Above about 250° C. the oxidation of ammonia to NO predominates, thus losing its selectivity. Medium temperature vanadium-based catalysts, e.g. $V_2O_5/TiO_2$, operate in the temperature range between about 260° C. and about 450° C. Again beyond about this higher temperature, selectivity is lost and NO is produced. If the exposure temperature of the $V_2O_5/TiO_2$ catalyst exceeds a certain level, the active, high surface area anatase phase of $TiO_2$ irreversibly converts to rutile with a surface area of less than 10 m²/g. Normally this conversion takes place at about 500° C. and about 550° C., but catalysts may include stabilisers to increase their thermal durability. Some $V_2O_5/TiO_2$ catalysts have been reported to be thermally stable up to about 700° C.

Zeolites can operate in the temperature range of about 350° C. to about 600° C. Zeolites suitable for use in catalysts according to the present invention include ZSM-5, mordenite, gamma-zeolite or beta-zeolite. They can comprise at least one metal or be metallised with at least one metal, which metal can be selected from one or more of Cu, Ce, Fe or Pt, and they can be ion-exchanged or impregnated Zeolites are characterised by their crystalline structure and $SiO_2:Al_2O_3$ ratio. For example, common mordenites have a ratio of about 10. When $NO_x$ is present in the exhaust gas, zeolite-based SCR catalysts do not oxidise ammonia to $NO_x$. Therefore, unlike Pt or $V_2O_5$ catalysts, its selectivity towards $NO_x$ conversion continually increases with temperature. However, zeolite-based catalysts can have stability problems when exposed to high temperatures in the presence of water vapour. At exposure temperatures above 600° C., in a high water content process stream, zeolites tend to deactivate by de-alumination whereby $Al^{3+}$ ion in the $SiO_2$—$Al_2O_3$ framework migrates out of the structure. This leads to permanent deactivation and, in extreme cases, collapse of the crystalline structure.

Of course, zeolites are preferred where adsorption of ammonia on a catalyst is required, see WO 99/55446.

The exhaust systems for the present invention are for IC engines and in particular to lean-burn IC engines. These can include gasoline lean-burn engines, such as gasoline direct injection (GDI) engines. It can also include diesel engines. In particular, diesel engines can include heavy-duty diesel engines (as defined in Europe by European Directives 88/77/EEC and 1999/96/EC). In the USA, heavy-duty vehicles are defined by gross vehicle weight rating (GVWR) 8,500 lbs in the US Federal jurisdiction and above 14,000 lbs in California (model year 1995 and later). The heavy-duty diesel category is subdivided into light heavy-duty diesel engines: <8,500 lbs<LHDDE<19,500 lbs (14,000 lbs<LHDDE<19,500 in California, 1995+); medium heavy-duty diesel engines: 19,500 lbs<MHDDE<33,000 lbs; and heavy heavy-duty diesel engines including urban buses): HHDDE>33,000 lbs. Diesel engines can also be light-duty diesel engines as defined in Europe by European Directive 70/220/EEC, as amended by 93/59/EC and 98/69/EC. In the USA passenger vehicles, light light-duty trucks (LLDT), below 6000 lbs GVWR and heavy light-duty trucks (HLDT), above 6000 lbs are included in the light-duty diesel category.

BRIEF DESCRIPTION OF THE DRAWINGS

In order that the invention may be more fully understood, embodiments of the invention are described with reference to the accompanying drawings, in which.

Figure 1:
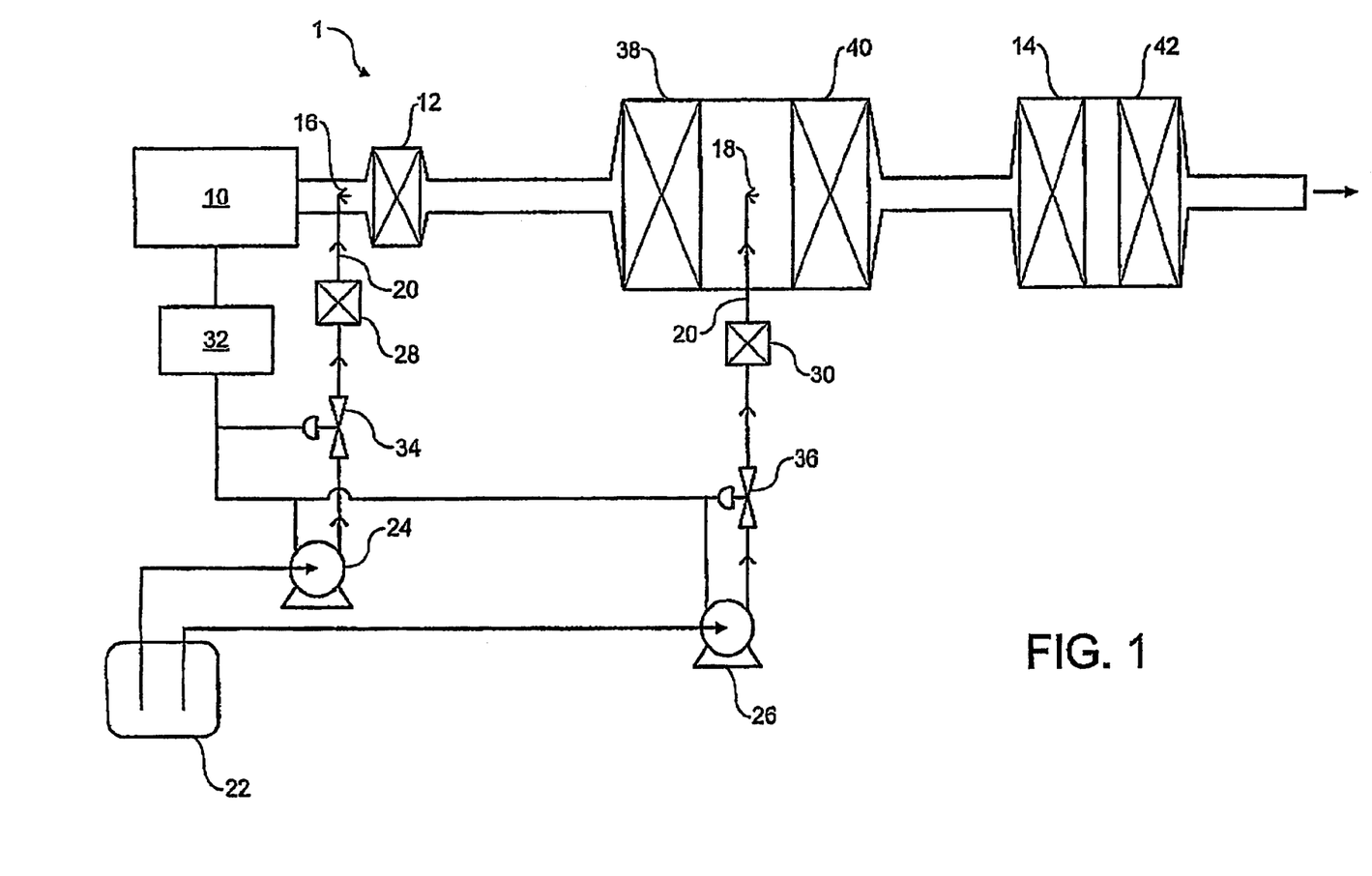
FIG. 1 is a schematic diagram of an exhaust system for a diesel engine including a close-coupled SCR catalyst and an underfloor SCR catalyst.

FIG. 1 is a schematic diagram of an exhaust system 1 for a diesel engine 10. The exhaust system 1 comprises a first SCR catalyst 12 in the close-coupled position and a second SCR catalyst 14 in the underfloor position. A first injection means 16 for introducing ammonia into an exhaust gas carried in the exhaust system 1 is disposed in the exhaust system 1 upstream of the first SCR catalyst 12. A second injection means 18 for introducing ammonia into an exhaust gas is disposed in the exhaust system 1 upstream of the second SCR catalyst 14 and downstream of the first SCR catalyst 12.

In the embodiment illustrated, ammonia is generated by hydrolysing an aqueous urea solution. The urea solution is stored in an optionally replaceable tank 22. Urea is drawn from the tank by pumps 24, 26 and conducted to optionally heated, e.g. to about 300° C., hydrolysis catalysts 28, 30. Ammonia liberated from the hydrolysis is conducted to the relevant injection means 16, 18 via tubing 20. Supply of the urea to the hydrolysis catalysts 28, 30 is controlled by valves 34, 36 which are in turn controlled by control unit 32, as are pumps 24, 26. Control unit 32 can include a preprogrammed microchip means, for example.

Control unit 32 receives signals from sensors (not shown) in the exhaust system and can adjust the flow of ammonia to the injections means 16, 18 accordingly. According to the present invention, ammonia is supplied to the inlet of the first catalyst when the first catalyst is below a first temperature e.g. about 275° C., and ammonia is supplied to the inlet of the second catalyst when the second catalyst is above a second temperature, e.g. about 175° C.

The illustrated embodiment includes a catalyst 38 for oxidising NO in an exhaust gas to $NO_2$. Such a catalyst can be a $Pt/Al_2O_3$ catalyst. The illustrated system also includes a DPF 40 comprising an SCR catalyst disposed downstream of the second injection means 18.

In the embodiment illustrated, ammonia can be introduced into the exhaust gas via first injection means 16 when the first catalyst reaches about 150° C. (referred to herein as the third temperature), e.g. following cold-start. $NO_x$ generated by the diesel engine 10 is reduced over the first SCR catalyst 12 to prevent it being exhausted to atmosphere. The supply of ammonia can be suspended when the first SCR catalyst 12 reaches a first temperature, e.g. about 200° C.

As the exhaust system heats up, the second catalyst 14 becomes sufficiently hot to catalyse the reduction of $NO_x$ and so ammonia is supplied to the second injection means 18. The temperature (referred to herein as the second temperature) of the second catalyst at which ammonia is injected via the second injection means can be higher or lower than the first temperature. In the embodiment illustrated it is about 175° C.

In order to avoid exhausting ammonia injected into the exhaust gas for treating $NO_x$ to atmosphere, the exhaust system 1 illustrated can include a clean-up catalyst 42 e.g. of known formulation.

An exhaust system for a diesel engine, which exhaust system comprising a catalyst for oxidising NO to $NO_2$ disposed upstream of a DPF is described in EP-A-0341832 and U.S. Pat. No. 4,902,487. PM trapped on the filter can be combusted in $NO_2$ generated upstream. A problem with this arrangement is that in certain operating conditions there can be insufficient $NO_x$ in the exhaust gas to increase the $NO_2$:NO ratio thereby to combust trapped PM. Reasons for low exhaust gas $NO_x$ levels can include: the engine temperature is too low e.g. following cold-start; the oxidation catalyst is not sufficiently hot enough to produce sufficient $NO_2$; and/or the exhaust system includes means for reducing the level of $NO_x$ in the exhaust gas e.g. exhaust gas recirculation (EGR). The embodiment illustrated according to the present invention includes at least one feature designed to meet these problems.

Control unit 32 can be programmed such that ammonia is supplied even after the first catalyst rises above a temperature at which it catalyses $NO_x$ reduction and instead leads to ammonia oxidation In this way additional $NO_x$ is introduced into the exhaust system and can be oxidised on the oxidation catalyst 38 thereby to produce $NO_2$ for combusting PM trapped on the DPF 40. The nature of the first SCR catalyst 12 can be chosen to oxidise ammonia to NO at lower temperatures where necessary. For example, platinum-containing SCR catalysts generally oxidise ammonia to NO at lower temperatures, e.g. > about 250° C., than vanadium-based catalysts generally which produce NO from $NH_3$ at above about 450° C.

Figure 2:
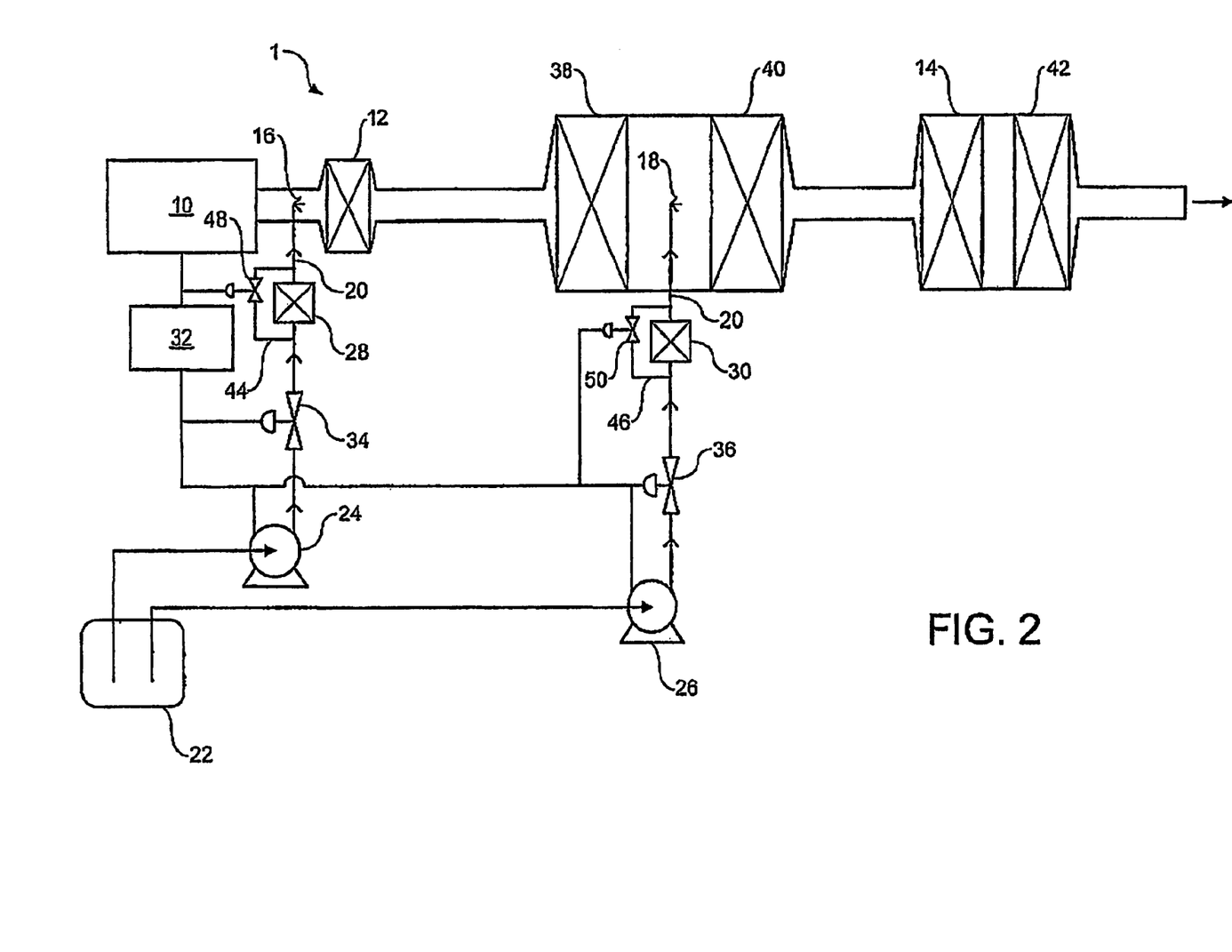
FIG. 2 is a further embodiment of the exhaust system according to the invention shown in FIG. 1.

Alternatively, in the embodiment illustrated in FIG. 1, the SCR catalyst supported on the DPF 40 can be referred to as the second catalyst and downstream SCR catalyst 14 can be referred to as a third (or a flier) SCR catalyst A variation of the exhaust system of FIG. 1 is shown in FIG. 2, with common features from FIG. 1 bearing the same reference numerals. The Exhaust system of FIG. 2 operates in the same way as described in connection with FIG. 1 except as follows.

The exhaust system in FIG. 2 includes a bypass 44, 46 of hydrolysis catalysts 28 and 30 respectively. Each bypass 44, 46 is controlled by a valve 48, 50, and each valve is controlled by control unit 32.

In use, the control unit 32 operates valves 48, 50 to enable urea to bypass the catalysts 28, 30. Flow of the urea to injection means 16, 18 is controlled by valves 34 and 36 during bypass operation. Operation of the bypass valves 48, 50, in the embodiment illustrated, is done immediately after key-off i.e. when SCR catalysts 12, 40 are still hot. At such temperature, urea can be hydrolysed to ammonia and the ammonia is adsorbed to the SCR catalysts 12, 40.

Since there is no exhaust gas flowing in the exhaust system, the adsorbed ammonia can remain adsorbed to the catalyst until key-on and is thus available to reduce $NO_x$ at low exhaust gas temperatures following start-up.

The following Examples are provided by way of illustration only.

EXAMPLE 1

$NO_X$ Conversion over Diesel Particulate Filter including SCR Catalyst

Figure 3:
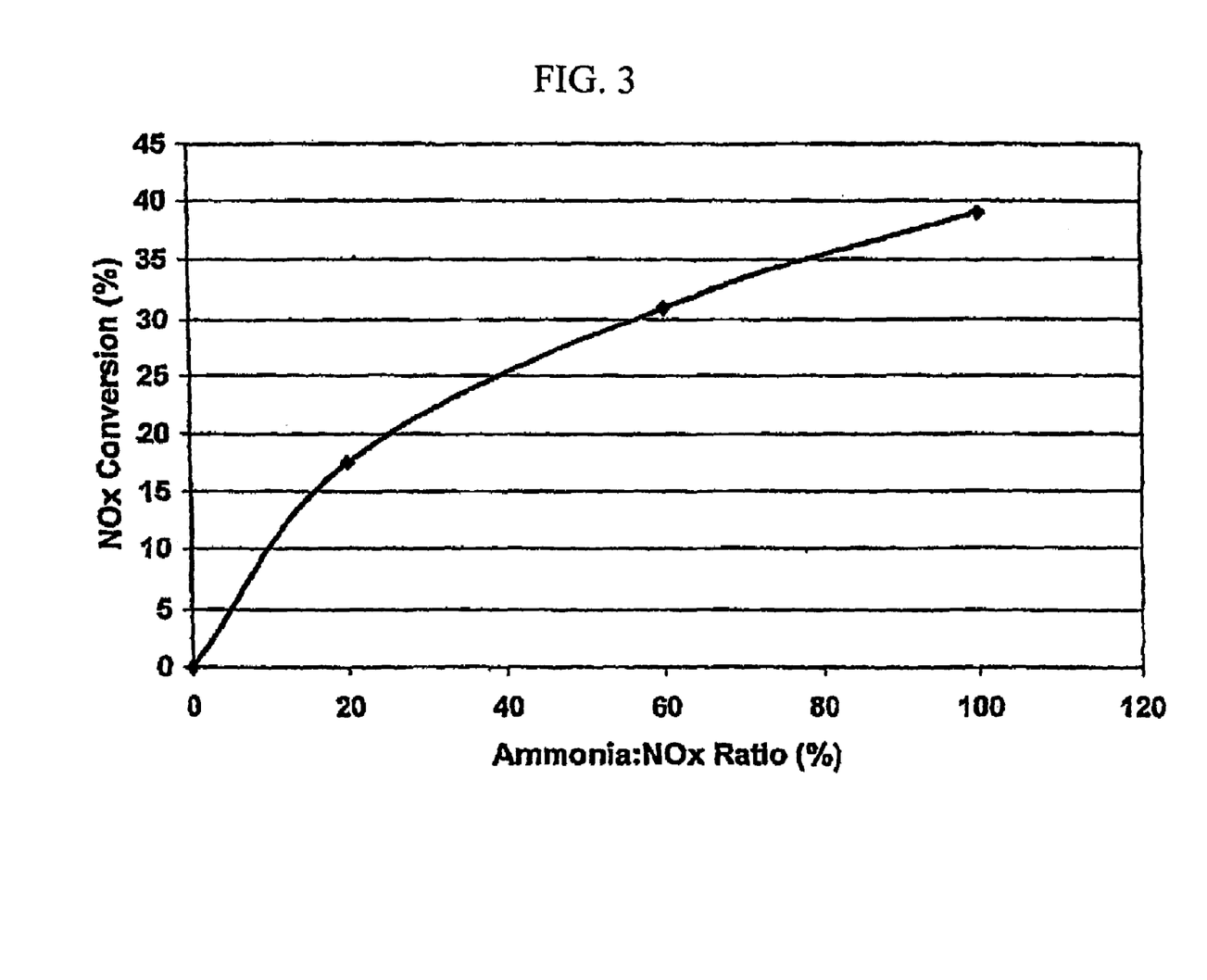
FIG. 3 is a graph showing the % $NO_x$ Conversion against % ammonia:$NO_x$ ratio for an exhaust system comprising 10 g/ft³ Pt catalyst for oxidising NO in a synthetic diesel feed gas to $NO_2$ and a $V_2O_5/TiO_2$ SCR catalyst coated on a downstream DPF. The system further comprises an injection means for introducing ammonia into the exhaust gas downstream of the oxidation catalyst. Measurements were taken at 350° C.

FIG. 3 shows a graph of the % $NO_x$ Conversion aghast % ammonia:$NO_x$ ratio for an exhaust system comprising 10 g/ft$^3$ Pt catalyst for oxidising NO in a synthetic diesel feed gas to $NO_2$ and a $V_2O_5/TiO_2$ SCR catalyst coated on a downstream DPF. The system further comprises an injection means for introducing ammonia into the exhaust gas downstream of the oxidation catalyst. Measurements were taken at 350° C. Peak $NO_x$ conversion is nearly 40%. Residual $NH_3$ injected upstream of the filter can 'slip' to a downstream SCR catalyst.

The arrangement including a further SCR catalyst downstream of the catalysed DPF is a variation on our system described in WO 99/39809 and marketed by Johnson Matthey as its SCRT™ device. Advantages of his modified arrangement include that some SCR conversion can then be obtained in the filter, meaning that the downstream SCR system (which today would typically be around 15-30 liters) could be reduced in size, because some of the $NO_x$, conversion had already been done within the filter.

A further advantage is that the excess urea which passes through the filter will be mixed more effectively as it leaves the filter, since filters introduce turbulence at their outlets. Improved mixing gives rise to increased conversion efficiency. Furthermore, within the SCRT™ system the filter gets hot before the SCR system, since it is closer to the engine. Therefore, by injecting urea in front of the filter we would be able to inject at an earlier point in the legislative cycle than would be the case if we were injecting urea just in front of the (sole) SCR catalyst. This last advantage is another way to obtain improved cold-start $NO_x$ performance.

EXAMPLE 2

$NO_x$ Conversion in SCRT™ System including Close-Coupled SCR Catalyst

This Example is designed to show the improvement in $NO_x$ control following cold-start in an exhaust system including a close-coupled SCR catalyst and associated upon ammonia injector coupled with an underfloor SCR catalyst when compared with an exhaust system including only an underfloor SCRT™ system. Whilst this Example does not include an SCR catalysed DPF, it will be appreciated that the combined close-coupled SCR catalyst/underfloor SCR catalyst system wherein the underfloor SCR catalyst is an SCR catalysed DPF would provide yet more $NO_x$ control, as demonstrated by the results in Example 1 above.

Tests were done on a bench engine including an exhaust system comprising an SCRT™ system. By "SCRT™" system we mean the system described in our WO 99/39809. Briefly, in order to form upstream to downstream, it consists of a catalyst for oxidising NO in the exhaust gas to $NO_2$, a filter for particulate matter in the exhaust gas, means for injecting a reductant into an exhaust gas carried in the exhaust system and a selective catalytic reduction catalyst. The combination of the NO oxidation catalyst and the filter, as a unit, is described herein as a CRT® and is described in more detail in our EP 0341832. The engine was a 10 liter heavy-duty turbo diesel engine configured to meet EU II legislation. Ammonia gas was injected into the exhaust as reductant. Emissions were measured using standard techniques.

The SCR catalyst in both the SCRT™ system and the close-coupled SCR catalyst was $V_2O_5/TiO_2$. All catalysts were coated on a ceramic honeycomb monolith of diameter 10.5 inches (26.67 cm) and length 6 inches (15.24 cm) (volume 8.5 liters). The cell density was 400 cells per square inch (cpsi (62 cells $cm^{-2}$) and the cell wall thickness was $6 \times 10^{-3}$ inches (0.015 cm). The CRT® filter unit consisted of a ceramic wall flow filter of diameter 10.5 inches (26.67 cm) and length 12 inches (53.34 cm) (volume 17 liters). The cell density was 200 cpsi and wall thickness was 0.014 inches (0.036 cm).

The catalysts were mounted in the exhaust system in two configurations. The first configuration was a base-line (or control) system comprising a SCRT™ system, consisting of a CRT® (oxidation catalyst+particulate filter) upstream of ammonia injection point and two SCR catalysts (17 liter volume) downstream of the ammonia injection point. The second configuration was the same as the base-line system described above but was expanded to include a further SCR catalyst (8.5 liters) upstream of the CRT®, in a close-coupled position (about 1 metre downstream of the turbo) with another ammonia injection point upstream of the whole system, according to the invention. In the second configuration ammonia was injected only through the injector situated upstream of the close-coupled SCR catalyst and not through the SCRT™ injector. Accordingly, the second configuration could be described as a close-coupled SCR catalyst with associated ammonia injector and underfloor SCR catalyst.

Figure 4:
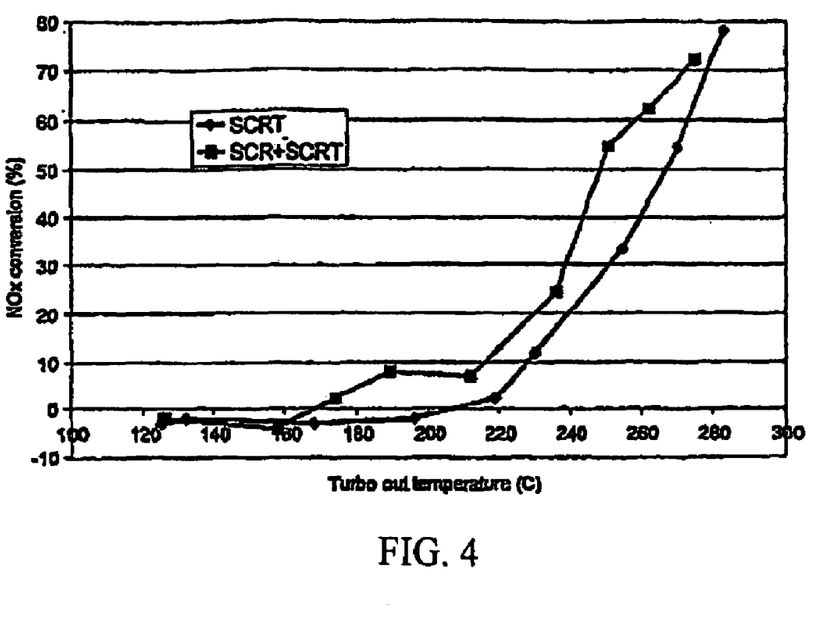
FIG. 4 is a graph illustrating light-off temperature for a SCRT™ system compared with a SCRT™ system including a close-coupled SCR catalyst.
Figure 5:
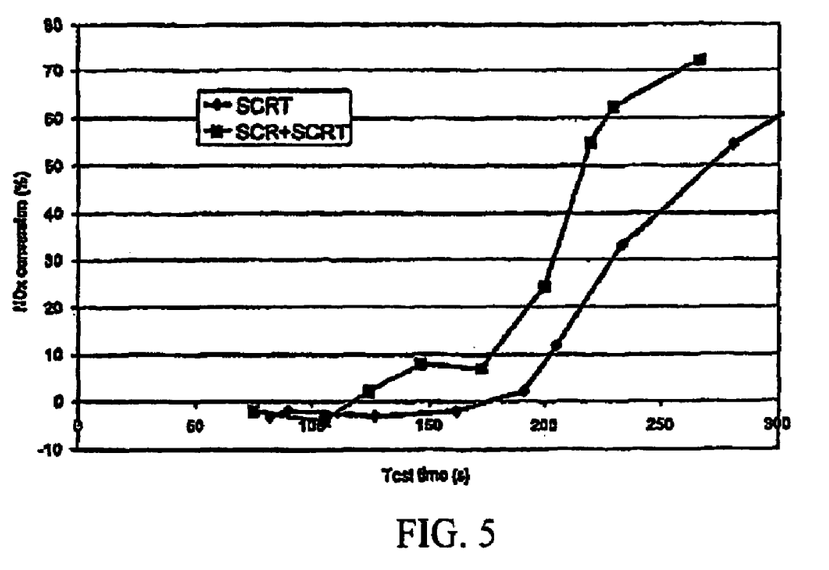
FIG. 5 is a graph illustrating time to light-off (in seconds) for the systems in FIG. 4.

These two systems were tested for $NO_x$ conversion over a temperature ramp between 125° C. and 275° C. turbo out temperatures (i.e. simulating a cold start situation). The light-off activity for the SCR reaction of the two systems is shown in FIG. 4. With an SCR catalyst in front of the SCRT™ system, light-off on is test procedure is achieved at 15° C. lower turbo-out temperature tin with the SCRT™ system alone. This difference is even more important when the time is considered. As shown in FIG. 5, the light-off tire over this test procedure for the SCR+SCRT™ system is about 1 minute less than for the SCRT™ system.

Thus, a close-coupled SCR catalyst can be employed to make more efficient use of the heat from the engine in cold s and/or transient situations.

EXAMPLE 3

$NO_x$ Conversion in SCRT™ System with Close-Coupled SCR Catalyst and Temperature Dependent Reduction Injection This Example is to compare the $NO_x$ conversion activity of first two exhaust system configurations of Example 2 with a third configuration in which ammonia was injected only via the close-coupled SCR catalyst injector during a warm-up phase (simulating cold-start or low temperature running) and then switched to injection via the SCRT™ injector when the SCRT™ SCR catalyst was up to temperature. This strategy is referred to herein as a dual-injector strategy.

A dual injector strategy for ammonia is ideally required to switch the system operation back to a standard SCRT™ configuration—upstream CRT® and downstream SCR—once the larger (and therefore more efficient) downstream SCR catalysts are warm enough to convert $NO_x$. To demonstrate this, the same ramp up procedure as described in the previous example was employed. Once 275° C. was reached, the engine was run at this point for 5 minutes to ensure the heat was distributed throughout the system. The overall $NO_x$ conversion from this test for the SCRT™, SCR+SCRT™ and the SCR+SCRT™ with optimised ammonia injection are summarised in table 1.

TABLE 1

Overall $NO_x$ conversion over a simulated cold-start test for different systems.

| System | Overall $NO_x$ conversion (%) |
|---|---|
| SCR + SCRT ™ (only upstream injection) | 51.7 |
| SCRT ™ | 54.7 |
| SCR + SCRT ™ (dual injector strategy) | 58.4 |

It is clear that the SCR+SCRT™ system, while having advantages during warm-up (as demonstrated in the previous example), is less good over the whole test as the small close-coupled SCR catalyst cannot convert all of the $NO_x$ from the engine. The SCRT™ system is better over this test as once the system is warm, the large SCR volume makes the $NO_x$ conversion much more efficient. But combining the two strategies, with ammonia injection upstream of the close-coupled SCR catalyst during the ramp up, followed by a switch of the ammonia injection to downstream of the CRT® (i.e. standard SCRT™ operation), gives the best overall $NO_x$ conversion. The system takes advantage of the fast warm-up of the close-coupled SCR and then the greater SCR volume once the downstream catalysts are warm.

EXAMPLE 4

Ammonia Storage on an SCR Catalyst

To quantify the amount of ammonia stored on an SCR catalyst, the following procedure was followed:

In a laboratory reactor, an SCR catalyst (coated on a ceramic honeycomb monolith of diameter 1 inch (2.54 cm) and length 3 inches (7.62 cm), with a cell density of 400 cpsi (62 cells $cm^{-2}$) per square inch and a cell wall thickness of $6 \times 10^{-3}$ inch (0.015 cm) was exposed to gas mix A to saturate the surface with ammonia (i.e. when inlet ammonia equals outlet ammonia). Then, gas mix B was introduced to react stored ammonia with $NO_x$ via the SCR reaction. The amount of $NO_x$ converted is therefore a measure of the amount of stored ammonia which is available for the SCR reaction. Gas mix B was continued until $NO_x$ conversion reached 0%.

Figure 6:
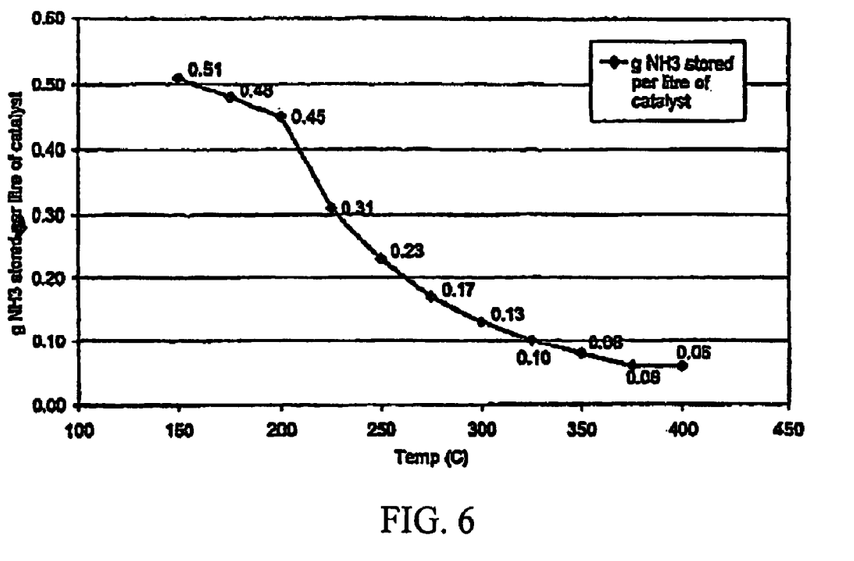
FIG. 6 is a graph showing the amount of stored ammonia available for the SCR reaction on an SCR catalyst.

GAS MIX A
Space Velocity: 30,000 $hr^{-1}$
NO: 0 ppm
$NO_2$: 0 ppm
$SO_2$: 0 ppm
$NH_3$: 200 ppm
$O_2$: 14%
$H_2O$: 4.5%
$CO_2$: 4.5%
$N_2$: balance GAS MIX B
Space Velocity: 30,000 $hr^{-1}$
NO: 100 ppm
$NO_2$: 100 ppm
$SO_2$: 0 ppm
$NH_3$: 0 ppm
$O_2$: 14%
$H_2O$: 4.5%
$CO_2$: 4.5%
$N_2$: balance The results are shown in FIG. 6. As temperature increases, the amount of $NH_3$ stored and available for reaction becomes less, and at low temperatures, there appears to be a saturation point at about 0.5 g $NH_3$/liter of catalyst. Clearly, however, it is possible to store ammonia on an SCR catalyst and use it for subsequent reaction with $NO_x$.

The length of time that measurable $NO_x$ conversion (>10%) is achieved in this test ranges from 15 minutes at 150° C. to 90 seconds at 400° C. Clearly, such times are not insignificant, and an on a vehicle a reductant injection strategy which takes advantage of this phenomenon could offer advantages.

EXAMPLE 5

Formation of Ammonia Using a Hydrocarbon-Reforming Catalyst

A rhodium containing catalyst, previously disclosed for hydrocarbon reforming by reaction with oxygen and water (WO 99/48805, Example 1), was prepared using known techniques. Briefly, a batch of catalyst with a nominal composition of 1% Rh/$CeO_2$—ZrO2 (based on the proportions of precursors) was prepared by impregnating 50 g of 50:50 (by mass) ceria-zirconia support material with an aqueous Rh-salt solution. The required amount of impregnating solution (30 $cm^3$) was prepared by adding distilled water to 3.64 g of aqueous rhodium(III) nitrate containing 0.5 g rhodium.

The impregnating solution was added to the support material and mixed thoroughly. Excess water was removed from the resultant paste, which was then left for 2 hours to form a semi-rigid cake. After breaking-up the cake, the lumps were dried at 120° C. for 8 hours, before being calcined in static air at 500° C. for 2 hours. Finally, the catalyst was crushed, pelletised (using a pressure of 8500 kg $cm^{-2}$ for 15 min) and sieved to collect granules in the range 0.3-0.8 mm diameter. No special activation was required prior to testing.

This catalyst was then exposed to an oxygen-rich synthetic exhaust-gas (inlet stream). The catalyst was in the form of a powder, which was loosely packed into a bed (0.6 g), to which the inlet stream was fed at a rate of 2 liters per minute. The inlet stream contained 1% $O_2$, 10% $CO_2$, 10% $H_2O$, and the balance was $N_2$. The gas emerging from the catalyst bed was analysed for hydrogen (using a mass spectrometer), while the inlet stream was heated from 150° C. to 600° C. at a rate of 5° C. per minute. As the temperature approached 200° C., 1% propene was added to the inlet stream to mimic the injection of fuel into the exhaust gas. As can be seen from the graph at FIG. 7, initially, no hydrogen was detected. However, when the temperature reached 250° C., the hydrogen peaks in the mass spectrum began to rise.

Figure 7:
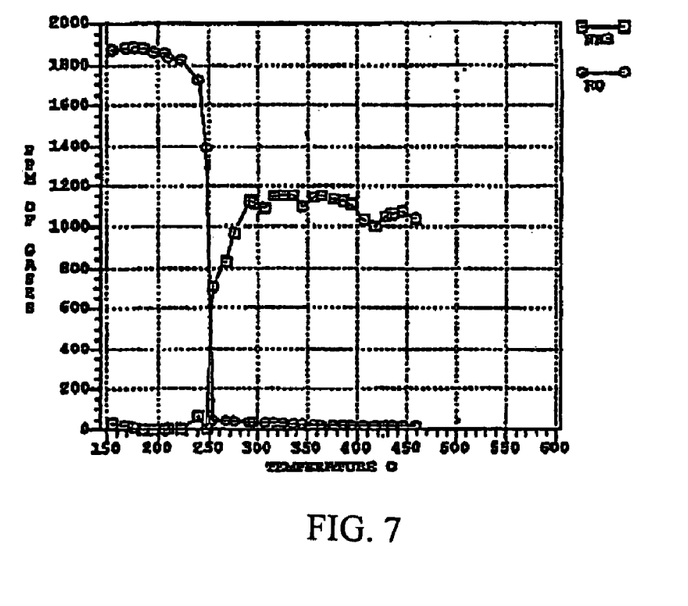
FIG. 7 is a graph showing $H_2$ or $NH_3$ detected in temperature for a 1 wt % Rh/Ce—Zr hydrocarbon reforming catalyst in a synthetic exhaust gas mixture.

The experiment was repeated, except that the inlet stream contained 1800 ppm NO in addition to 1% $O_2$, 10% $CO_2$, and 10% $H_2O$. Once again, as the temperature approached 200° C., 1% propene was added. In this experiment, the gas emerging from the catalyst bed was analysed for $NO_x$ and ammonia. The $NO_x$ concentration began to decline as soon as the propene was added, but no ammonia was detected initially. As can be seen in the Figure, the temperature reached 250° C., ammonia formation suddenly began to occur, and at the same time the rate of $NO_x$ conversion increased (see figure below). Between 310° C. and 370° C., the ammonia concentration in the emerging gas stabilised at 1150 ppm, corresponding to hydrogenation of 65% of the $NO_x$ in the inlet stream. The remaining 35% of the $NO_x$ was reduced to $N_2$.

These experiments showed that, by using a reforming catalyst, it is possible to convert hydrocarbon and $NO_x$ to ammonia in an exhaust gas. The onset of ammonia formation corresponds closely to the temperature at which hydrogen formation is detected when $NO_x$ is absent. The results indicate that as soon as the reforming reactions start to occur, the hydrogen formed can immediately react with $NO_x$ to form ammonia

The invention claimed is:

1. A method of selectively catalysing the reduction of $NO_x$ in an exhaust gas flowing in an exhaust system of a vehicle comprising a lean-burn internal combustion engine, which exhaust system comprising a first SCR catalyst for selectively catalysing the reduction of $NO_x$ with a nitrogenous reducing agent located at up to 1 metre downstream from an exhaust manifold or turbo of the engine, a filter for particulate matter located in an underfloor position, which filter comprising a second selective catalytic reduction (SCR) catalyst, which method comprising contacting the first SCR catalyst with the nitrogenous reducing agent in the presence of the exhaust gas.

2. A method according to claim 1, wherein the first SCR catalyst is located at up to 0.5 meters downstream from the exhaust manifold or turbo.

3. A method according to claim 1, wherein the nitrogenous reducing agent contacts the first SCR catalyst when the first SCR catalyst is below a first temperature which is in the range 175-600° C.

4. A method according to claim 3, wherein the first temperature is in the range 250-450° C.

5. A method according to claim 3, wherein the first temperature is in the range 300-400° C.

6. A method according to claim 3 further comprising the steps of introducing the nitrogenous reducing agent into the exhaust gas between the first and second SCR catalysts and contacting the second SCR catalyst with the nitrogenous reducing agent, wherein the nitrogenous reducing agent contacts the second catalyst when the second SCR catalyst is above a second temperature in the range 175-600° C.

7. The method of claim 6, wherein the first temperature is the same as the second temperature.

8. A method according to claim 3 further comprising the steps of generating $NO_x$ from nitrogenous reducing agent on the first SCR catalyst and combusting particulate matter trapped with the filter in $NO_2$ in the $NO_x$.

9. A method according to claim 8, comprising the step of oxidising NO in the $NO_x$ to $NO_2$ and combusting PM trapped on the filter in the $NO_2$.

10. A method according to claim 1 further comprising the step of discontinuing the contact of the nitrogenous reducing agent with the first SCR catalyst when the first SCR catalyst is below a third temperature which is in the range 75-200° C.

11. A method according to claim 10, wherein the third temperature is in the range 100-175° C.

12. A method according to claim 10, wherein the third temperature is in the range 125-160° C.

13. A method according to claim 1 further comprising the steps of introducing the nitrogenous reducing agent into the exhaust gas between the first and the second SCR catalysts and contacting the second SCR catalyst with the nitrogenous reducing agent.

14. A method according to claim 13, wherein the nitrogenous reducing agent contacts the second SCR catalyst when the second SCR catalyst is above a second temperature which is in the range 175-600° C.

15. A method according to claim 14, wherein the second temperature is in the range 250-450° C.

16. A method according to claim 14, wherein the second temperature is in the range 300-400° C.

17. A method according to claim 13 further comprising the step of discontinuing the contact of the nitrogenous reducing agent with the second SCR catalyst when the second SCR catalyst is above a fourth temperature which is at least 250° C.

18. A method according to claim 17, wherein the fourth temperature is in the range 250-600° C.

19. A method according to claim 17, wherein the fourth temperature is in the range 450-600° C.

20. A method according to claim 17, wherein the fourth temperature is at least 600° C.

21. A method according to claim 1 further comprising the step of oxidising NO in the exhaust gas to $NO_2$ and combusting PM trapped on the filter with the $NO_2$.

22. A method according to claim 1, comprising the step of contacting gas leaving the filter with a third SCR catalyst.

23. A method according to claim 1, wherein the nitrogenous reducing agent is a nitrogenous compound.

24. A method according to claim 23, wherein the nitrogenous compound is a nitrogen hydride.

25. A method according to claim 24, wherein the nitrogen hydride is ammonia or hydrazine.

26. A method according to claim 23 further comprising the step of reacting a hydrocarbon and lean exhaust gas over a reforming catalyst to form the nitrogenous compound.

27. A method according to claim 26, wherein the nitrogenous compound is selected from the group of ammonia, a nitrile, an amine, an oxime and an isocyanate.

28. A method according to claim 26, wherein the reforming catalyst comprises a platinum group metal (PGM) or Ni.

29. A method according to claim 28, wherein the PGM is Rh, Pt or Rh-Pt.

30. A method according to claim 26, wherein the reforming catalyst comprises a support selected from the group consisting of alumina, titania, ceria, zirconia, silica, silica-alumina, mixtures, and mixed oxides containing any two or more thereof.

31. A vehicle comprising a lean-burn internal combustion engine and an exhaust system therefor, which exhaust system comprising a first SCR catalyst for selectively catalysing the reduction of $NO_x$ with a nitrogenous reducing agent located at up to 1 metre from an exhaust manifold or turbo of the engine, a first means for introducing a nitrogenous reducing agent, or a precursor thereof, into an exhaust gas carried by the exhaust system upstream of the first selective catalytic reduction (SCR) catalyst and a filter for particulate matter located in an underfloor position of the vehicle, which filter comprising a second SCR catalyst.

32. A vehicle according to claim 31, wherein the first SCR catalyst is located at up to 0.5 meters downstream from the exhaust manifold or turbo.

33. A vehicle according to claim 31, comprising a second nitrogenous reducing agent introducing means for introducing a nitrogenous reducing agent into the exhaust gas between the first SCR catalyst and the second SCR catalyst.

34. A vehicle according to claim 33 further comprising means for controlling the introduction of the nitrogenous reducing agent, or a precursor thereof, into the exhaust gas through the second introducing means during a drive cycle, wherein the control means causes the introduction of the nitrogenous reducing agent into the exhaust gas through the second introducing means when the second catalyst is above a second temperature which is in the range 175-600° C.

35. A vehicle according to claim 34, wherein the second temperature is in the range 250-450° C.

36. A vehicle according to claim 34, wherein the second temperature is in the range 300-400° C.

37. A vehicle according to claim 34 further comprising means for controlling the introduction of the nitrogenous reducing agent, or a precursor thereof, into the exhaust gas through the first introducing means during a drive cycle and for causing the introduction of the nitrogenous reducing agent, or a precursor thereof, into the exhaust gas through the first introducing means when the first catalyst is below a first temperature which is in the range 175-600° C., wherein the first temperature is the same as the second temperature.

38. A vehicle according to claim 34, wherein the control means interrupts the introduction of the nitrogenous reducing agent into the exhaust gas through the second introducing means when the second catalyst is above a fourth temperature which is at least 250° C.

39. A vehicle according to claim 38, wherein the fourth temperature is in the range 450-600° C.

40. A vehicle according to claim 38, wherein the fourth temperature is at least 600° C.

41. A vehicle according to claim 33 further comprising a catalyst for oxidising NO to $NO_2$ disposed between the second means for introducing the nitrogenous reducing agent and the filter.

42. A vehicle according to claim 41, wherein the oxidation catalyst comprises a platinum group metal.

43. A vehicle according to claim 42, wherein the platinum group metal is platinum, not Pt/MgO.

44. A vehicle according to claim 31, comprising means for controlling the introduction of the nitrogenous reducing agent, or a precursor thereof, into the exhaust gas through the first introducing means during a drive cycle.

45. A vehicle according to claim 44, wherein the control means causes the introduction of the nitrogenous reducing agent, or a precursor thereof, into the exhaust gas through the first introducing means when the first catalyst is below a first temperature which is in the range 175-600° C.

46. A vehicle according to claim 45, wherein the first temperature is in the range 250-450° C.

47. A vehicle according to claim 45, wherein the first temperature is in the range 300-400° C.

48. A vehicle according to claim 44, wherein the control means interrupts the introduction of the nitrogenous reducing agent through the first introducing means when the first catalyst is below a third temperature which is in the range 75-200° C.

49. A vehicle according to claim 48, wherein the third temperature is in the range 100-175° C.

50. A vehicle according to claim 48, wherein the third temperature is in the range 125-160° C.

51. A vehicle according to claim 48, wherein the fourth temperature is in the range 250-600° C.

52. A vehicle according to claim 31, comprising means for controlling the introduction of the nitrogenous reducing agent, or a precursor thereof, into the exhaust gas through the second introducing means during a drive cycle.

53. A vehicle according to claim 31, wherein the filter comprises an oxidation catalyst.

54. A vehicle according to claim 53, wherein the oxidation catalyst is selected from the group consisting of a platinum group metal, a cerium component and a zirconium component.

55. A vehicle according to claim 54, wherein the platinum group metal is platinum, not Pt/MgO.

56. A vehicle according to claim 31 further comprising a catalyst for oxidising NO to $NO_2$ disposed between the first catalyst and the filter.

57. A vehicle according to claim 56, wherein the oxidation catalyst comprises a platinum group metal.

58. A vehicle according to claim 57, wherein the platinum group metal is platinum, not Pt/MgO.

59. A vehicle according to claim 31 further comprising a further catalyst for selectively catalysing the reduction of $NO_x$ with a reducing agent disposed downstream of the filter.

60. A vehicle according to claim 31 further comprising a reservoir of nitrogenous reducing agent or a precursor thereof.

61. A vehicle according to claim 60, wherein the nitrogenous reducing agent is a nitrogenous compound.

62. A vehicle according to claim 61, wherein the nitrogenous compound is a nitrogen hydride.

63. A vehicle according to claim 62, wherein the nitrogen hydride is ammonia or hydrazine.

64. A vehicle according to claim 31, wherein the nitrogenous reducing agent precursor is a precursor of a reducing agent for catalysing the reduction of $NO_x$.

65. A vehicle according to claim 64, wherein the nitrogenous reducing agent is ammonia and the precursor is urea or ammonium carbamate.

66. A vehicle according to claim 65, wherein the urea in an aqueous solution.

67. A vehicle according to claim 66, wherein the aqueous urea solution is an eutectic mixture.

68. A vehicle according to claim 66, wherein the aqueous urea solution further comprises additives to reduce the aqueous urea solution crystallisation temperature.

69. A vehicle according to claim 65, wherein the urea is a solid.

70. A vehicle according to claim 31, wherein the first SCR catalyst comprises a platinum group metal.

71. A vehicle according to claim 70, wherein the platinum group metal is platinum, not Pt/MgO.

72. A vehicle according to claim 31, wherein the second SCR catalyst comprises a platinum group metal.

73. A vehicle according to claim 72, wherein the second SCR catalyst comprises platinum, not Pt/MgO.

74. A vehicle according to claim 31, wherein the first and second SCR catalysts comprise a base metal selected from the group consisting of iron, cerium, copper and vanadium.

75. A vehicle according to claim 74, wherein the first and second SCR catalysts comprise at least one of Mo and W.

76. A vehicle according to claim 74, wherein the base metal is supported.

77. A vehicle according to claim 76, wherein the base metal support is selected from the group consisting of alumina, titania, silica, silica-alumina, ceria, zirconia, zeolite, mixture, and mixed oxide of any two or more thereof.

78. A vehicle according to any of claim 76, wherein the base metal support is a zeolite.

79. A vehicle according to claim 78, wherein the zeolite is selected from the group consisting of ZSM-5, mordenite, gamma-zeolite and beta-zeolite.

80. A vehicle according to claim 78, wherein the zeolite comprises at least one metal or is metallised with at least one metal.

81. A vehicle according to claim 80, wherein the at least one metal is selected from the group consisting of Cu, Ce, Fe, Pt and any two or more thereof.

82. A vehicle according to claim 78, wherein the zeolite is ion-exchanged or impregnated.

83. A vehicle according to claim 31, wherein the lean-burn internal combustion engine is a diesel engine.

84. A vehicle according to claim 83, wherein the diesel engine is a heavy-duty diesel engine.

85. A vehicle according to claim 31, wherein the lean-burn internal combustion engine is a gasoline engine.

86. A vehicle according to claim 85 wherein the gasoline engine is a direct injection (GDI) engine.

* * * * *

UNITED STATES PATENT AND TRADEMARK OFFICE
CERTIFICATE OF CORRECTION

PATENT NO. : 7,264,785 B2  Page 1 of 1
APPLICATION NO. : 10/499714
DATED : September 4, 2007
INVENTOR(S) : Philip Gerald Blakeman et al.

It is certified that error appears in the above-identified patent and that said Letters Patent is hereby corrected as shown below:

On the Title Page,

At page 2, under "FOREIGN PATENT DOCUMENTS,"

"DE    1 174 599 A1  1/2002"

should be

--EP    1 174 599 A1  1/2002--.

Signed and Sealed this

Twenty-fourth Day of February, 2009

JOHN DOLL
*Acting Director of the United States Patent and Trademark Office*